(12) United States Patent
Fischer et al.

(10) Patent No.: US 9,470,181 B2
(45) Date of Patent: Oct. 18, 2016

(54) SEALED SHUNT WIRE FOR A FLUID PUMP

(71) Applicant: DELPHI TECHNOLOGIES, INC., Troy, MI (US)

(72) Inventors: John G. Fischer, Goodrich, MI (US); Mitchal A. Peterson, Grand Blanc, MI (US)

(73) Assignee: Delphi Technologies, Inc., Troy, MI (US)

( * ) Notice: Subject to any disclaimer, the term of this patent is extended or adjusted under 35 U.S.C. 154(b) by 236 days.

(21) Appl. No.: 14/054,994

(22) Filed: Oct. 16, 2013

(65) Prior Publication Data

US 2015/0104339 A1    Apr. 16, 2015

(51) Int. Cl.

| F02M 21/02 | (2006.01) |
|---|---|
| F02M 37/08 | (2006.01) |
| F04D 13/06 | (2006.01) |
| H01R 39/36 | (2006.01) |
| H02K 5/12 | (2006.01) |
| H02K 5/14 | (2006.01) |

(Continued)

(52) U.S. Cl.
CPC ..... F02M 21/0245 (2013.01); F02M 21/0296 (2013.01); F02M 37/08 (2013.01); F04D 13/0693 (2013.01); H01R 39/36 (2013.01); H02K 5/12 (2013.01); H02K 5/148 (2013.01); H02K 13/10 (2013.01); H02K 7/14 (2013.01); Y10T 29/49236 (2015.01)

(58) Field of Classification Search
CPC .............. F02M 21/0245; F02M 21/0296; F02M 37/08; F04D 13/0693; Y10T 29/49236; H01R 39/36; H02K 13/10; H02K 5/12; H02K 5/148; H02K 7/14

USPC .............. 417/423.7, 423.14, 410.1
See application file for complete search history.

(56) References Cited

U.S. PATENT DOCUMENTS

| 4,445,802 | A |   | 5/1984 | Loov |   |
|---|---|---|---|---|---|
| 5,013,222 | A | * | 5/1991 | Sokol | F02M 37/08 123/497 |

(Continued)

FOREIGN PATENT DOCUMENTS

| DE | 3438680 A1 | 5/1985 |
|---|---|---|
| DE | 3708521 A1 | 9/1987 |

(Continued)

OTHER PUBLICATIONS

EP Search Report Dated Feb. 16, 2016.

*Primary Examiner* — William H Rodriguez
*Assistant Examiner* — Christopher Brunjes
(74) *Attorney, Agent, or Firm* — Joshua M. Haines

(57) ABSTRACT

A fluid pump includes a hollow housing, an electric motor having an armature with a commutator, a pump section rotationally coupled to the electric motor for receiving fuel at a relatively low pressure through a fuel inlet and pressurizing the fuel to a relatively high pressure, a motor brush is in electrical contact with the commutator and including a shunt wire extending therefrom, and an end cap that closes one end of the housing and defines a high pressure chamber with the housing. The end cap includes a hollow brush tower extending therefrom and defining a brush holder slidably receiving the motor brush therein such that the brush holder defines in part the high pressure chamber. The end cap also includes an aperture with the shunt wire extending therethrough such that the shunt wire is sealed with the aperture to prevent the fuel from passing therethrough.

14 Claims, 3 Drawing Sheets

(51) Int. Cl.
*H02K 7/14* (2006.01)
*H02K 13/10* (2006.01)

(56) References Cited

U.S. PATENT DOCUMENTS

| | | | | |
|---|---|---|---|---|
| 5,208,499 | A * | 5/1993 | Barber | H01R 39/388 |
| | | | | 310/239 |
| 6,048,640 | A * | 4/2000 | Walters | A61N 1/046 |
| | | | | 206/438 |
| 7,874,816 | B2 | 1/2011 | Fischer et al. | |
| 2008/0063545 | A1 | 3/2008 | Takagi et al. | |
| 2009/0087324 | A1 * | 4/2009 | Fischer | F02M 37/08 |
| | | | | 417/423.14 |
| 2010/0047090 | A1 * | 2/2010 | Marx | F02M 37/08 |
| | | | | 417/410.1 |
| 2011/0116955 | A1 | 5/2011 | Naito et al. | |
| 2014/0314591 | A1 * | 10/2014 | Herrera | F04D 13/06 |
| | | | | 417/410.1 |

FOREIGN PATENT DOCUMENTS

| | | |
|---|---|---|
| DE | 3700823 A1 | 7/1988 |
| WO | 2010/116777 A1 | 10/2010 |

* cited by examiner

SEALED SHUNT WIRE FOR A FLUID PUMP

TECHNICAL FIELD OF INVENTION

The present invention relates to a fluid pump; more particularly to a fuel pump; even more particularly to a fuel pump with an electric motor having a pair of motor brushes; and still even more particularly to such a fuel pump in which shunt wires of the motor brushes are sealed with an end cap of the fuel pump.

BACKGROUND OF INVENTION

Fluid pumps, and more particularly fuel pumps for pumping fuel, for example, from a fuel tank of a motor vehicle to an internal combustion engine of the motor vehicle, are known. U.S. Pat. No. 7,874,816 to Fischer et al. teaches a fuel pump which includes a pump section driven by an electric motor. Rotation of the pump section by the electric motor causes fuel at a relatively low pressure to be elevated to a relatively high pressure for delivery to an internal combustion engine. The electric motor includes a rotor or armature with a commutator and a plurality of motor windings. A pair of motor brushes are provided to deliver electricity to the commutator, and consequently to the motor windings. Each brush is mounted within an end cap and is exposed to the high pressure fuel. Each brush also includes a flexible shunt wire which allows the brush to be placed in continuous contact with the armature under the force of a brush spring. Each shunt wire is connected to a respective terminal through a radio frequency interference (RFI) suppression circuit within the fuel pump. Each terminal passes through the end cap in order to be connected to an electricity source through a mating connector. The interface between the terminals and the end cap must be sealed in order to prevent pressurized fuel within the fuel pump from escaping at the interface between the terminals and the end cap. The terminals are substantially rigid to allow operations such as press fitting the terminals to the end cap and sealing the interface between the terminals and the end cap. The terminals, sealing of the terminals to the end cap, and the mating connector may be costly to implement.

What is needed is a fuel pump which minimizes or eliminates one or more of the shortcomings as set forth above.

SUMMARY OF THE INVENTION

Briefly described, a fluid pump includes a hollow housing and an electric motor having an armature with a commutator such that the electric motor is rotatable about a motor axis with application of an electric current to the commutator. The fluid pump also includes a pump section rotationally coupled to the electric motor for receiving fuel at a relatively low pressure through a fuel inlet and pressurizing the fuel to a relatively high pressure. A motor brush is in electrical contact with the commutator and has a shunt wire extending therefrom. An end cap closes one end of the housing and defines a high pressure chamber with the housing which is occupied by the fuel at the relatively high pressure. The end cap includes a hollow brush tower extending therefrom and defining a brush holder slidably receiving the motor brush therein such that the brush holder defines in part the high pressure chamber. The end cap also includes an aperture with the shunt wire extending therethrough to allow the shunt wire to exit the end cap such that the shunt wire is sealed with the aperture to substantially prevent the fuel from passing through the aperture.

BRIEF DESCRIPTION OF DRAWINGS

This invention will be further described with reference to the accompanying drawings in which.

DETAILED DESCRIPTION OF INVENTION

Figure 1:
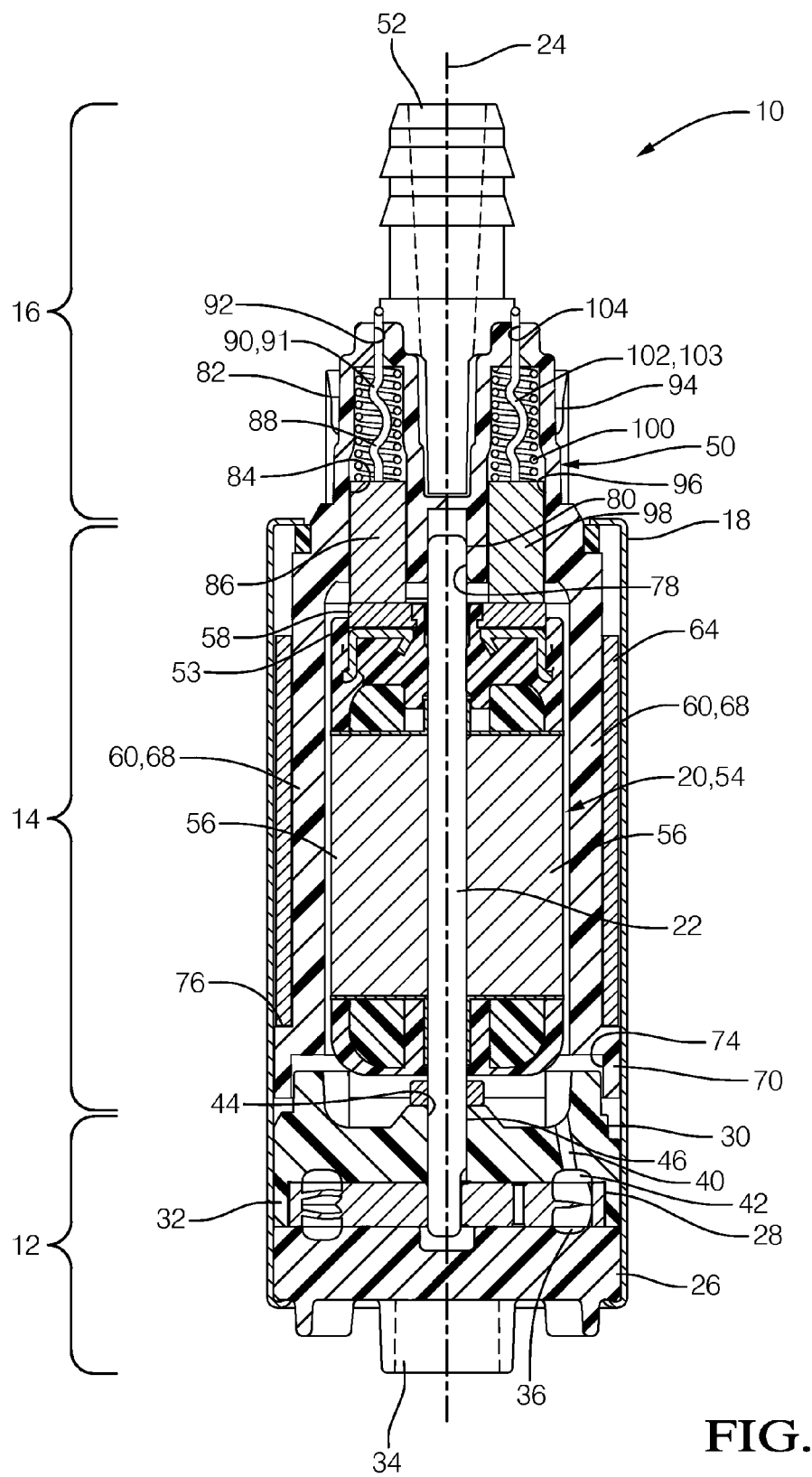
FIG. 1 is an axial cross-sectional view of a fuel pump in accordance with the present invention.
Figure 2:
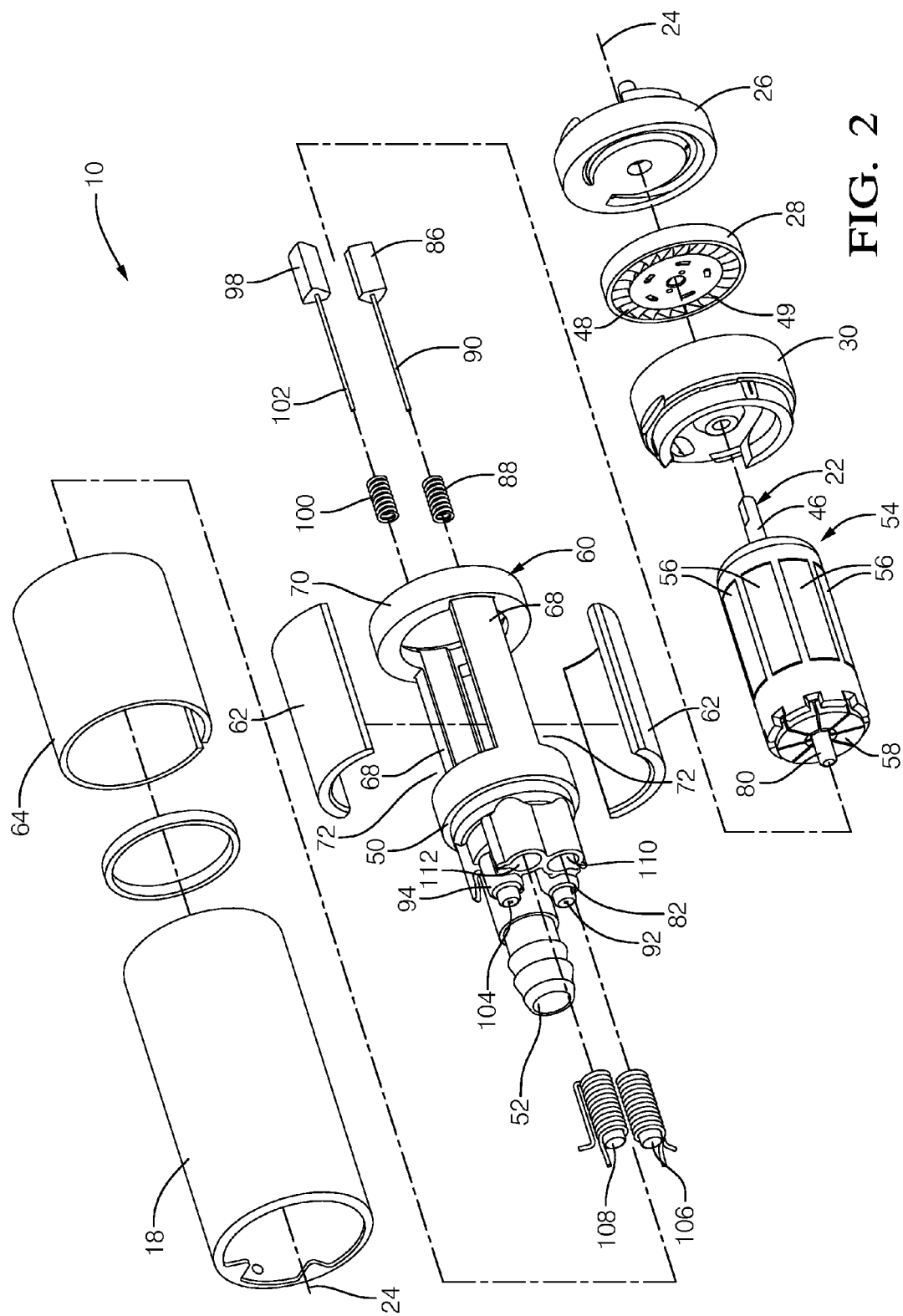
FIG. 2 is an exploded isometric view of the fuel pump in accordance with the present invention.
Figure 3:
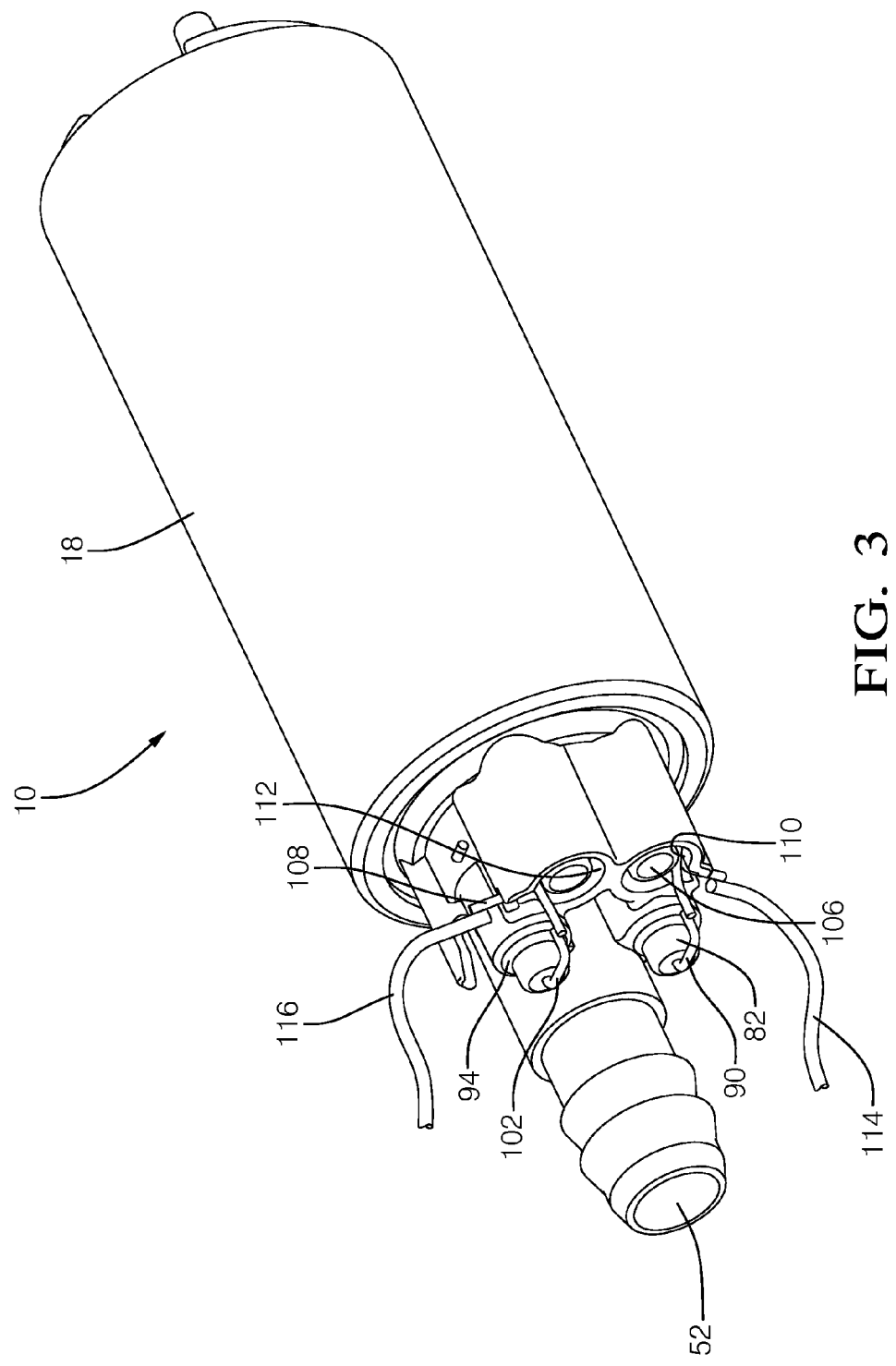
FIG. 3 is an isometric view of the fuel pump in accordance with the present invention.

Reference will be made to FIG. 1 which is an axial cross-sectional view of a fluid pump illustrated as fuel pump 10 for pumping liquid fuel, for example gasoline or diesel fuel, from a fuel tank (not shown) to an internal combustion engine (not shown). Reference will also be made to FIGS. 2 and 3 in which FIG. 2 is an isometric exploded view of fuel pump 10 and FIG. 3 is an isometric view of fuel pump 10. While the fluid pump is illustrated as fuel pump 10, it should be understood that the invention is not to be limited to a fuel pump, but could also be applied to fluid pumps for pumping fluids other than fuel. Fuel pump 10 generally includes a pump section 12 at one end, a motor section 14 adjacent to pump section 12, and an outlet section 16 adjacent to motor section 14 at the end of fuel pump 10 opposite pump section 12. A housing 18 of fuel pump 10 retains pump section 12, motor section 14 and outlet section 16 together. Fuel enters fuel pump 10 at pump section 12, a portion of which is rotated by motor section 14 as will be described in more detail later, and is pumped past motor section 14 to outlet section 16 where the fuel exits fuel pump 10.

Motor section 14 includes an electric motor 20 which is disposed within housing 18. Electric motor 20 includes a shaft 22 extending therefrom into pump section 12. Shaft 22 rotates about a motor axis 24 when an electric current is applied to electric motor 20. Electric motor 20 will be described in greater detail later.

Pump section 12 includes an inlet plate 26, an impeller 28, and an outlet plate 30. Inlet plate 26 is disposed at the end of pump section 12 that is distal from motor section 14 while outlet plate 30 is disposed at the end of pump section 12 that is proximal to motor section 14. Both inlet plate 26 and outlet plate 30 are fixed relative to housing 18 to prevent relative movement between inlet plate 26 and outlet plate 30 with respect to housing 18. Outlet plate 30 defines a spacer ring 32 on the side of outlet plate 30 that faces toward inlet plate 26. Impeller 28 is disposed axially between inlet plate 26 and outlet plate 30 such that impeller 28 is radially surrounded by spacer ring 32. Impeller 28 is fixed to shaft 22 such that impeller 28 rotates with shaft 22 in a one-to-one relationship. Spacer ring 32 is dimensioned to be slightly thicker than the dimension of impeller 28 in the direction of motor axis 24, i.e. the dimension of spacer ring 32 in the direction of motor axis 24 is greater than the dimension of impeller 28 in the direction of motor axis 24. In this way, inlet plate 26, outlet plate 30, and spacer ring 32 are fixed within housing 18, for example by crimping the end of housing 18 proximal to outlet plate 30. Axial forces created by the crimping process will be carried by spacer ring 32, thereby preventing impeller 28 from being clamped tightly between inlet plate 26 and outlet plate 30 which would prevent impeller 28 from rotating freely. Spacer ring 32 is also dimensioned to have an inside diameter that is larger than the outside diameter of impeller 28 to allow impeller 28 to rotate freely within spacer ring 32 and axially between inlet plate 26 and outlet plate 30. While spacer ring 32 is illustrated as being made as a single piece with outlet plate 30, it should be understood that spacer ring 32 may alternatively be made as a separate piece that is captured axially between outlet plate 30 and inlet plate 26.

Inlet plate 26 is generally cylindrical in shape, and includes an inlet 34 that extends through inlet plate 26 in the same direction as motor axis 24. Inlet 34 is a passage which introduces fuel into fuel pump 10. Inlet plate 26 also includes an inlet plate flow channel 36 formed in the face of inlet plate 26 that faces toward impeller 28. Inlet plate flow channel 36 is in fluid communication with inlet 34.

Outlet plate 30 is generally cylindrical in shape and includes an outlet plate outlet passage 40 that extends through outlet plate 30 in the same general direction as motor axis 24. Outlet plate outlet passage 40 is in fluid communication with outlet section 16 as will be describe in more detail later. Outlet plate 30 also includes an outlet plate flow channel 42 formed in the face of outlet plate 30 that faces toward impeller 28. Outlet plate flow channel 42 is in fluid communication with outlet plate outlet passage 40. Outlet plate 30 also includes an outlet plate aperture, hereinafter referred to as lower bushing 44, extending through outlet plate 30. Shaft 22 extends through lower bushing 44 in a close fitting relationship such that shaft 22 is able to rotate freely within lower bushing 44 and such that radial movement of shaft 22 within lower bushing 44 is substantially prevented. In this way, lower bushing 44 radially supports a lower end 46 of shaft 22 that is proximal to pump section 12.

Impeller 28 includes a plurality of blades 48 arranged in a polar array radially surrounding and centered about motor axis 24 such that blades 48 are aligned with inlet plate flow channel 36 and outlet plate flow channel 42. Blades 48 are each separated from each other by a blade chamber 49 that passes through impeller 28 in the general direction of motor axis 24. Impeller 28 may be made, for example only, by a plastic injection molding process in which the preceding features of impeller 28 are integrally molded as a single piece of plastic.

Outlet section 16 includes an end cap 50 having an outlet 52 for discharging fuel from fuel pump 10. End cap 50 closes one end of housing 18 and defines a high pressure chamber 53 with housing 18 which is occupied by fuel at a relatively high pressure that has exited outlet plate outlet passage 40. Outlet 52 may be connected to, for example only, a conduit (not shown) for supplying fuel to an internal combustion engine (not shown). Outlet 52 is in fluid communication with outlet plate outlet passage 40 of outlet plate 30 for receiving fuel that has been pumped by pump section 12. End cap 50 may include additional features relative to motor section 14 as will be described in greater detail below.

Electric motor 20 includes a rotor or armature 54 with a plurality of circumferentially spaced motor windings 56 and a commutator 58, a motor frame 60, a pair of permanent magnets 62, and a flux carrier 64. Each magnet 62 is in the shape of a segment of a hollow cylinder. Motor frame 60 may be integrally formed with end cap 50 and includes a plurality of circumferentially spaced legs 68 extending axially away from end cap 50 toward pump section 12. Motor frame 60 also includes a base section 70 axially spaced apart from end cap 50 by legs 68. End cap 50, legs 68, and base section 70 are preferably integrally formed from a single piece of plastic, for example only, by a plastic injection molding process.

Legs 68 are preferably equally circumferentially spaced around end cap 50 and base section 70 and define motor frame openings 72 between legs 68. Motor frame openings 72 extend axially from end cap 50 to base section 70. One magnet 62 is disposed within each motor frame opening 72. Magnets 62 may be inserted within respective motor frame openings 72 after motor frame 60 has been formed. Alternatively, magnets 62 may be insert molded with motor frame 60 when motor frame 60 is formed by a plastic injection molding process. In this way, magnets 62 and legs 68 radially surround armature 54. While two legs 68 and two magnets 62 have been illustrated, it should be understood that other quantities of legs 68 and magnets 62 may be used.

Base section 70 may be annular in shape and connects legs 68 to each other. Base section 70 includes a base section recess 74 extending axially thereinto from the end of base section 70 that faces away from end cap 50. Base section recess 74 receives outlet plate 30 closely therein such that radial movement of outlet plate 30 within base section recess 74 is substantially prevented. Base section 70 also defines an annular shoulder 76 that faces toward end cap 50. Annular shoulder 76 may be substantially perpendicular to motor axis 24.

Flux carrier 64 is made of a ferromagnetic material and may take the form of a cylindrical tube. Flux carrier 64 closely radially surrounds legs 68 of motor frame 60 and magnets 62. Flux carrier 64 may be made, for example only, from a sheet of ferromagnetic material formed to shape by a rolling process. The end of flux carrier 64 that is proximal to base section 70 of motor frame 60 axially abuts annular should 76 of base section 70 while the other end of flux carrier 64 abuts a portion of end cap 50 that is proximal to end cap 50. In this way, flux carrier 64 is captured axially between end cap 50 and annular shoulder 76 of base section 70.

End cap 50 defines an upper bushing 78 therein which radially supports an upper end 80 of shaft 22 that is proximal to outlet section 16. Upper bushing 78 is coaxial with base section recess 74. Since upper bushing 78 is coaxial with base section recess 74, a coaxial relationship is maintained between lower bushing 44 and upper bushing 78. Shaft 22 is able to rotate freely within upper bushing 78 such that radial movement of shaft 22 within upper bushing 78 is substantially prevented.

End cap 50 includes a hollow first brush tower 82 which extends outward from end cap 50 in the same general direction as motor axis 24. First brush tower 82 defines a first brush holder 84 therein which slidably receives a first motor brush 86 which is urged into contact with commutator 58 of armature 54 by a first brush spring 88 that is positioned axially between first motor brush 86 and first brush tower 82 within first brush holder 84. First motor brush 86 includes a first shunt wire 90 extending therefrom which exits first brush holder 84 through a first aperture 92 formed therein. First shunt wire 90 includes a first shunt wire slack portion 91 within first brush holder 84, thereby preventing first shunt wire 90 from inhibiting first brush spring 88 from urging first motor brush 86 into contact with commutator 58 as first motor brush 86 wears in use by allowing first motor brush 86 to move axially within first brush holder 84. First brush holder 84 defines in part high pressure chamber 53, and consequently is subject to the fuel at relatively high pressure. Consequently, first shunt wire 90 is sealed with first aperture 92 to prevent fuel from escaping high pressure chamber 53 through first aperture 92. First shunt wire 90 may be sealed with first aperture 92 in a variety of ways including, but not limited to, heat staking, sonic welding, melt flowing, and compression fittings. As shown, the portion of first brush tower 82 defining first aperture 92 has been heated and compressed around first shunt wire 90 in order to seal first shunt wire 90 with first aperture 92. When the portion of first brush tower 82 defining first aperture 92 is heated, the plastic from which it is made is softened. Consequently, when the portion of first brush tower 82 defining first aperture 92 is compressed, first aperture 92 is reduced in size to seal with first shunt wire 90.

End cap 50 also includes a hollow second brush tower 94 which extends outward from end cap 50 in the same general direction as motor axis 24. Second brush tower 94 defines a hollow second brush holder 96 therein which slidably receives a second motor brush 98 which is urged into contact with commutator 58 of armature 54 by a second brush spring 100 that is positioned axially between second motor brush 98 and second brush tower 94 within second brush holder 96. Second motor brush 98 includes a second shunt wire 102 extending therefrom which exits second brush holder 96 through a second aperture 104 formed therein. Second shunt wire 102 includes a second shunt wire slack portion 103 within second brush holder 96, thereby preventing second shunt wire 102 from inhibiting second brush spring 100 from urging second motor brush 98 into contact with commutator 58 as second motor brush 98 wears in use by allowing second motor brush 98 to move axially within second brush holder 96. Second brush holder 96 defines in part high pressure chamber 53, and consequently is subject to the fuel at relatively high pressure. Consequently, second shunt wire 102 is sealed with second aperture 104 to prevent fuel from escaping high pressure chamber 53 through second aperture 104. Second shunt wire 102 may be sealed with second aperture 104 in a variety of ways including, but not limited to, heat staking, sonic welding, melt flowing, and compression fittings. As shown, the portion of second brush tower 94 defining second aperture 104 has been heated and compressed around second shunt wire 102 in order to seal second shunt wire 102 with second aperture 104. When the portion of second brush tower 94 defining second aperture 104 is heated, the plastic from which it is made is softened. Consequently, when the portion of second brush tower 94 defining second aperture 104 is compressed, second aperture 104 is reduced in size to seal with second shunt wire 102.

First shunt wire 90 and second shunt wire 102 are connected in opposing polarity to an electricity source (not shown). Consequently, first motor brush 86 and second motor brush 98 deliver electrical power to motor windings 56 via commutator 58, thereby rotating armature 54 and shaft 22 about motor axis 24. Since first shunt wire 90 and second shunt wire 102 exit end cap 50 through first aperture 92 and second aperture 104 respectively, electrical connections within fuel pump 10 are eliminated and the need for costly terminals are also eliminated.

A first radio frequency interference (RFI) suppression circuit 106 may be included between first shunt wire 90 and the electricity source. Similarly, a second RFI suppression circuit 108 may be included between second shunt wire 102 and the electricity source. First RFI suppression circuit 106 may be received within a first pocket 110 formed on the exterior of end cap 50. In this way, first RFI suppression circuit 106 is supported by end cap 50 and is not within high pressure chamber 53. Similarly, second RFI suppression circuit 108 may be received within a second pocket 112 formed on the exterior of end cap 50. In this way, second RFI suppression circuit 108 is supported by end cap 50 and is not within high pressure chamber 53. First RFI suppression circuit 106 and second RFI suppression circuit 108 may each comprise a conductive coil formed around a ferromagnetic core such that one end of each coil is connected to a respective first shunt wire 90 or second shunt wire 102 while the other end of each coil is connected to a respective negative lead 114 or a respective positive lead 116 where negative lead 114 is connected to the negative side of the electricity source and positive lead 116 is connected to the negative side of the electricity source. While not shown, a capacitor may be connected between first RFI suppression circuit 106 and second RFI suppression circuit 108. For example, the capacitor may be connected to first RFI suppression circuit 106 where first RFI suppression circuit 106 is attached to negative lead 114 and the capacitor may also be connected to second RFI suppression circuit 108 where second RFI suppression circuit 108 is attached to positive lead 116. In this way, RFI produced by motor section 14 may be suppressed in operation.

In operation, inlet 34 is exposed to a volume of fuel (not shown) which is to be pumped to, for example only, an internal combustion engine (not shown). An electric current is supplied to motor windings 56 in order to rotate shaft 22 and impeller 28. As impeller 28 rotates, fuel is drawn through inlet 34 into inlet plate flow channel 36. Blade chambers 49 allow fuel from inlet plate flow channel 36 to flow to outlet plate flow channel 42. Impeller 28 subsequently discharges the fuel through outlet plate outlet passage 40 and consequently through outlet 52.

While this invention has been described in terms of preferred embodiments thereof, it is not intended to be so limited.

We claim:

1. A fluid pump comprising:
  a hollow housing;
  an electric motor having an armature with a commutator, said electric motor being rotatable about a motor axis with application of an electric current to said commutator;
  a pump section rotationally coupled to said electric motor for receiving fuel at a relatively low pressure through a fuel inlet and pressurizing said fuel to a relatively high pressure;
  a motor brush in electrical contact with said commutator and having a shunt wire extending therefrom; and
  an end cap closing one end of said housing and defining a high pressure chamber with said housing which is occupied by said fuel at said relatively high pressure;
  said end cap comprising:
    a hollow brush tower extending therefrom and defining a brush holder slidably receiving said motor brush therein, said brush holder defining in part said high pressure chamber;
    an aperture with said shunt wire extending therethrough to allow said shunt wire to exit said end cap to the exterior of said fuel pump, wherein said shunt wire is sealed with said aperture to prevent said fuel from passing through said aperture to the exterior of said fuel pump.

2. A fluid pump as in claim 1 wherein said aperture is in said brush tower.

3. A fluid pump as in claim 1 wherein said shunt wire includes a shunt wire slack portion which allows for axial movement of said motor brush within said brush holder.

4. A fluid pump as in claim 1 wherein said end cap defines a pocket outside of said high pressure chamber for receiving a RFI suppression circuit within said pocket, said RFI suppression circuit being connected to said shunt wire.

5. A fluid pump as in claim 1 wherein said end cap defines an upper bushing which radially supports a first end of a shaft of said electric motor.

6. A fluid pump as in claim 5 wherein said end cap defines in part a motor frame of said electric motor, said motor frame comprising a base section, and a plurality of legs axially separating said end cap and said base section.

7. A fluid pump as in claim 6 further comprising a lower bushing which radially supports a second end of said shaft wherein said base section maintains a coaxial relationship between said lower bushing and said upper bushing.

8. A fluid pump as in claim 6 wherein said plurality of legs define motor frame openings spaced circumferentially therebetween.

9. A fluid pump as in claim 8 further comprising a plurality of magnets wherein each one of said plurality of magnets is disposed within a respective one of said motor frame openings.

10. A fluid pump as in claim 6 wherein said base section connects each of said plurality of legs.

11. A method for making a fuel pump including a hollow housing; an electric motor having an armature with a commutator, said electric motor being rotatable about a motor axis with application of an electric current to said commutator; a pump section rotationally coupled to said electric motor for receiving fuel at a relatively low pressure through a fuel inlet and pressurizing said fuel to a relatively high pressure; a motor brush in electrical contact with said commutator and having a shunt wire extending therefrom; and an end cap closing one end of said housing and defining a high pressure chamber with said housing which is occupied by said fuel at said relatively high pressure, said method comprising:
   providing a hollow brush tower extending from said end cap and defining a brush holder slidably receiving said motor brush therein, said brush holder defining in part said high pressure chamber;
   providing an aperture in said end cap;
   extending said shunt wire through said aperture to allow said shunt wire to exit said end cap to the exterior of said fuel pump; and
   sealing said shunt wire with said aperture to prevent said fuel from passing through said aperture to the exterior of said fuel pump.

12. A method as in claim 11 further comprising providing said shunt wire with a shunt wire slack portion within said brush holder to allow for axial movement of said motor brush within said brush holder.

13. A method as in claim 11 wherein said step of sealing said shunt wire with said aperture comprises:
   heating a portion of said brush tower which defines said aperture;
   compressing said portion of said brush tower which has been heated around said shunt wire, thereby sealing said shut wire with said aperture.

14. A method as in claim 13 where said step of compressing comprises reducing the size of said aperture.

* * * * *